United States Patent
Kang et al.

(10) Patent No.: US 8,682,109 B2
(45) Date of Patent: Mar. 25, 2014

(54) METHOD AND SYSTEM OF RECONSTRUCTING SUPER-RESOLUTION IMAGE

(75) Inventors: Bong-hyup Kang, Changwon (KR); Han-seok Ko, Seoul (KR); Tae-yup Song, Seoul (KR); Bon-hwa Ku, Seoul (KR); Young-hyun Lee, Seoul (KR); Min-jae Kim, Seoul (KR); Dae-sung Chung, Seoul (KR); Hyun-hak Shin, Seoul (KR)

(73) Assignees: Samsung Techwin Co., Ltd., Changwon (KR); Korea University Research and Business Foundation, Seoul (KR)

( * ) Notice: Subject to any disclaimer, the term of this patent is extended or adjusted under 35 U.S.C. 154(b) by 302 days.

(21) Appl. No.: 13/185,810

(22) Filed: Jul. 19, 2011

(65) Prior Publication Data
US 2012/0051667 A1 Mar. 1, 2012

(30) Foreign Application Priority Data
Aug. 27, 2010 (KR) ........................ 10-2010-0083702

(51) Int. Cl.
*G06K 9/32* (2006.01)
*G09G 5/02* (2006.01)

(52) U.S. Cl.
USPC ............................ 382/299; 382/300; 345/698

(58) Field of Classification Search
None
See application file for complete search history.

(56) References Cited

U.S. PATENT DOCUMENTS

| 6,766,067 | B2 * | 7/2004 | Freeman et al. ............... 382/299 |
| 8,254,726 | B2 * | 8/2012 | Ichihashi et al. ............... 382/300 |
| 2004/0218834 | A1 * | 11/2004 | Bishop et al. ................. 382/299 |

FOREIGN PATENT DOCUMENTS

| KR | 10-2005-0002979 A | 1/2005 |
| KR | 10-2007-0016909 A | 2/2007 |
| KR | 10-2009-0073554 A | 7/2009 |

* cited by examiner

*Primary Examiner* — Randolph I Chu
(74) *Attorney, Agent, or Firm* — Sughrue Mion, PLLC (57) ABSTRACT

A method and system of generating a super-resolution image is provided. fusing The method includes inputting an image; and generating an estimated high-resolution image of a current time by fusing an input image and an estimated high-resolution image of a previous time corresponding to the input image.

15 Claims, 6 Drawing Sheets

METHOD AND SYSTEM OF RECONSTRUCTING SUPER-RESOLUTION IMAGE

CROSS-REFERENCE TO RELATED PATENT APPLICATION

This application claims priority from Korean Patent Application No. 10-2010-0083702, filed on Aug. 27, 2010, in the Korean Intellectual Property Office, the disclosure of which is incorporated herein in its entirety by reference.

BACKGROUND

1. Field

Methods and apparatuses consistent with exemplary embodiment related to generating a super-resolution image, and more particularly, to generating a super-resolution image with high resolution from an input image with low resolution.

2. Description of the Related Art

A surveillance camera system, such as an illegally parked vehicle detecting system, captures images of distant locations or objects with a camera, such as a closed-circuit television (CCTV) camera, a digital camera, a mobile camera, or the like. An image captured by a camera is transmitted to a CCTV or a monitoring system. Therefore, in an illegally parked vehicle detecting system, states of locations or objects may be confirmed with a CCTV or a monitor to be away from corresponding spots.

Here, a captured image may be deteriorated with low resolution due to reasons including blur or noise from a lens or a sensor of a camera, image compression due to limited capacity of a storage medium, or the like. In such an image with low resolution, loss of important information, such as the face of a person, silhouette of an object, alphanumeric characters, etc., may occur.

Accordingly, it is difficult to secure sufficient information required for recognition of the face of a person, a road sign, or a license plate number of a vehicle with such an image with low resolution. Therefore, a surveillance camera system, such as an illegally parked vehicle detecting system, may not properly function on low-resolution input images.

SUMMARY

One or more exemplary embodiments provide a method of generating a super-resolution image by fusing pixel data of a high-resolution image, which is an image estimated at a previous time, and pixel data of a low-resolution image, which is an image input at a current time, and a system directed to this method.

According to an aspect of an exemplary embodiment, there is provided a method of generating a super-resolution image, the method including inputting an image; and generating an estimated high-resolution image of a current time by fusing an input image and an estimated high-resolution image of a previous time corresponding to the input image.

The estimated high-resolution image of the current time is generated by upsampling the input image to high resolution and fusing the upsampled input image and the high-resolution image of the previous time which is aligned with the upsampled input image.

The input image may be upsampled to the high resolution by using a Kalman filter.

The method may further include calculating an image registration error between the upsampled input image and the estimated high-resolution image of the previous time; comparing the image registration error to a threshold value; and updating the estimated high-resolution image of the current time by reflecting the estimated high-resolution image of the previous time and the upsampled input image if the image registration error is less than the threshold value.

The estimated high-resolution image of the current time may be updated by reflecting the estimated high-resolution image of the previous time without the upsampled input image if the image registration error is not less than the threshold value.

The image registration error may be calculated for each pixel between the upsampled input image and the estimated high-resolution image of the previous time, and the estimated high-resolution image of the current time may be updated for each pixel according to the image registration error.

The image registration error may be calculated using a Mahalanobis distance.

The method may further include calculating a number of invalid pixels each of which has the image registration error not less than the threshold value; comparing the number of the invalid pixels to a limit pixel number; and determining the estimated high-resolution image of the current image as an image of the current time if the number of the invalid pixels is less than the limit pixel number.

The estimated high-resolution image of the previous time may be initialized and the high-resolution image of the current time is determined without considering the estimated high-resolution image before the initialization if the number of the invalid pixels is not less than the limit pixel number.

According to an aspect of another exemplary embodiment, there is provided a surveillance system including an image inputting unit through which an image is input; a detecting unit which detects a selected region from the input image; an image generation unit which generates a super-resolution image having a higher resolution than a resolution of the input image with respect to the selected region; and a recognizing unit which recognizes content included in the super-resolution image, wherein the super-resolution image is generated by generating an estimated high-resolution image of a current time by fusing the input image and an estimated high-resolution image of a previous time corresponding to the input image.

If the selected region is not detected from the input image, the image generation unit may generate the super-resolution image with respect to the entire region of the input image, and the detecting unit may detect the selected region from the super-resolution image generated with respect to the entire region of the input image.

The selected region may include a sub-region including the content.

The estimated high-resolution image of the current time may be generated by upsampling the input image to high resolution and fusing the upsampled input image and the high-resolution image of the previous time which is aligned with the upsampled input image.

The image generation unit may calculate an image registration error between the input image and the estimated high-resolution image of the previous time, and may update the estimated high resolution image of the current time by reflecting the estimated high-resolution image of the previous time without the upsampled input image if the image registration error is not less than the threshold value.

In the image generation unit, the image registration error may be calculated for each pixel between the upsampled input image and the estimated high-resolution image of the previous time, and the estimated high-resolution image of the current time may be updated for each pixel according to the image registration error.

The image registration error may be calculated using a Mahalanobis distance.

The image generation unit may calculate a number of invalid pixels each of which has the image registration error not less than the threshold value and may determine the estimated high-resolution image of the current time as an image of the current time if the number of the invalid pixels is less than a limit pixel number.

The estimated high-resolution image of the previous time may be initialized and the high-resolution image of the current time may be determined without considering the estimated high-resolution image before the initialization if the number of the invalid pixels is not less than the limit pixel number.

The super-resolution image may be generated with respect to the selected region only if the selected region is located within a predetermined distance from a corresponding selected region detected at a previous time.

The image inputting unit may include a single camera installed at a particular location.

BRIEF DESCRIPTION OF DRAWINGS

The above and other aspects will become more apparent by describing in detail exemplary embodiments with reference to the attached drawings, in which.

DETAILED DESCRIPTION OF EXEMPLARY EMBODIMENTS

Hereinafter, exemplary embodiments will be described in detail with reference to the attached drawings.

Figure 1:
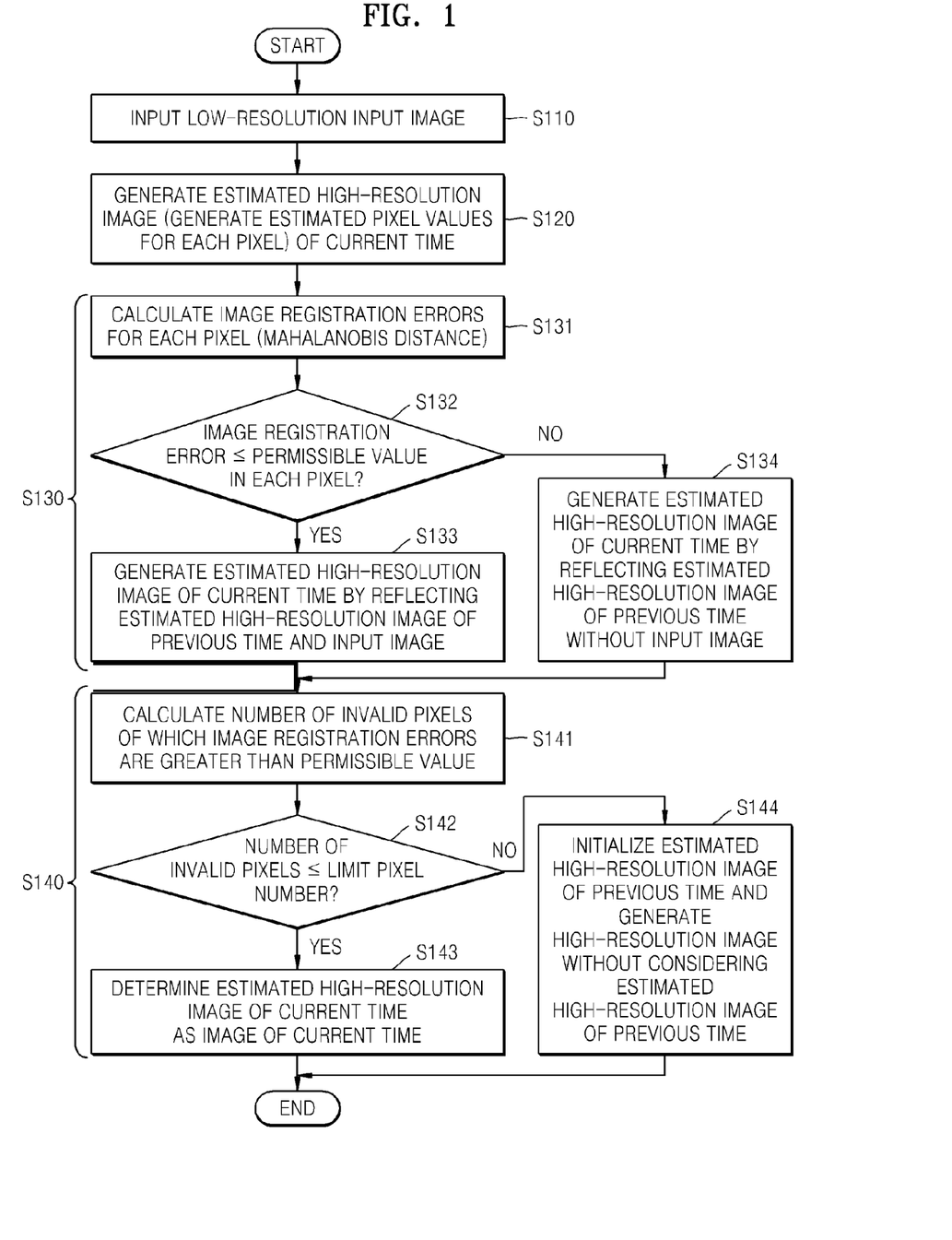
FIG. 1 is a flowchart of a method of reconstructing a super-resolution image, according to an exemplary embodiment.

FIG. 1 is a flowchart of a method of reconstructing a super-resolution image, according to an exemplary embodiment.

Referring to FIG. 1, the method may achieve reconstruction of a super-resolution image from a low-resolution input image. The method may employ a dynamic super-resolution algorithm based on sequential data fusion.

An image acquired by using an image input device, such as a closed-circuit television (CCTV) camera, a digital camera, a mobile camera, or the like, may be a low-resolution image. The low resolution image may include blur or noise input from a lens or a sensor of a camera, or may be caused by excessive image compression due to limited capacity of a storage medium, or the like. In such an image with low resolution, loss of important information, such as a face of a person, a silhouette of an object, alphanumeric characters, etc., may occur. Therefore, a surveillance system, such as a system for detecting illegally parked vehicles, may only perform limited recognitions of a face of a person or a license plate number of a vehicle with such a low-resolution image.

However, the method according to the present exemplary embodiment may enable reconstruction of a super-resolution image with high resolution by using one or more low-resolution images. Therefore, a face of a person and/or a license plate number of a vehicle may be recognized using one or more low-resolution images.

The method may include an operation of inputting a low-resolution image (S110), an operation of estimating a high-resolution image (S120), and an operation of detecting a scene change (S140). The operation of verifying an estimated high-resolution image (S130) is performed to generate the high-resolution image of the current time in operation S120. Thus, the operation S120 will be described in detail with reference to the operation S130.

In operation S110, a low-resolution image is input. In operation S120, a high-resolution image of a current time is generated by fusing pixel information corresponding to a high-resolution image generated at a previous time and pixel information corresponding to the input low-resolution image.

The high-resolution image of the current time is generated by fusing only two images, that is, the low-resolution input image of the current time and the high-resolution image of the previous time during alignment and fusion of the images. Therefore, memory consumption for estimating the high-resolution image of the current time may be reduced, and a time taken for estimating the high resolution image of the current time may also be reduced. Therefore, the method according to the present exemplary embodiment may easily embody a real-time surveillance system.

In operation S130, a reconstruction error (deterioration of efficiency of reconstructing a super-resolution image) due to misalignment of images is compensated for based on an image registration error (or motion estimation error) between an upsampled image of the input low-resolution image of the current time and the estimated high-resolution image of the previous time. In other words, in operation S130, if the image registration error is not less than a threshold value, it is determined as misalignment of images, and the upsampled image of the current time will not be used for estimating pixel values of the high-resolution image of the current time. Therefore, deterioration of the efficiency of reconstructing a super-resolution image due to misalignment of images may be prevented.

In operation S140, the high-resolution image estimated at the previous time is initialized in a case of an unexpected scene change. Therefore, an image fusion error due to the unexpected scene change during reconstruction of the super-resolution image may be prevented.

A motion-based super-resolution algorithm reconstructs a high-resolution image by estimating and compensating for motions existing between input low-resolution images and fusing pixel values of the low-resolution images. In this regard, a low-resolution image corresponding to the square of an image enlargement ratio is necessary. The efficiency of reconstructing a high-resolution image may be significantly affected by preciseness of estimating motions between images and alignment of low-resolution images based on the estimation.

A static super-resolution algorithm employing batch data fusion aligns a plurality of low-resolution images, with respect to a reference image and estimates pixels of a high-resolution image by using pixel information of the plurality of aligned low-resolution images.

In this case, it is necessary to input and align a plurality of low-resolution images to reconstruct a single high-resolution image. Therefore, there is a need for a memory space for storing a plurality of low-resolution images, and the overall process becomes relatively slow. Therefore, it is difficult to apply the algorithm to a real-time surveillance system.

However, according to the method of the present exemplary embodiment, an estimated high-resolution image of a current time t may be generated by aligning and/or fusing two images only, that is, a low-resolution image of the current time and a high resolution image of a previous time, as will be further explained later in reference to FIG. 2.

Therefore, memory consumption for estimating a high-resolution image may be reduced, and the estimation of the high-resolution image may be performed faster. Therefore, the method may be easily realized in a real-time surveillance system.

Figure 2:
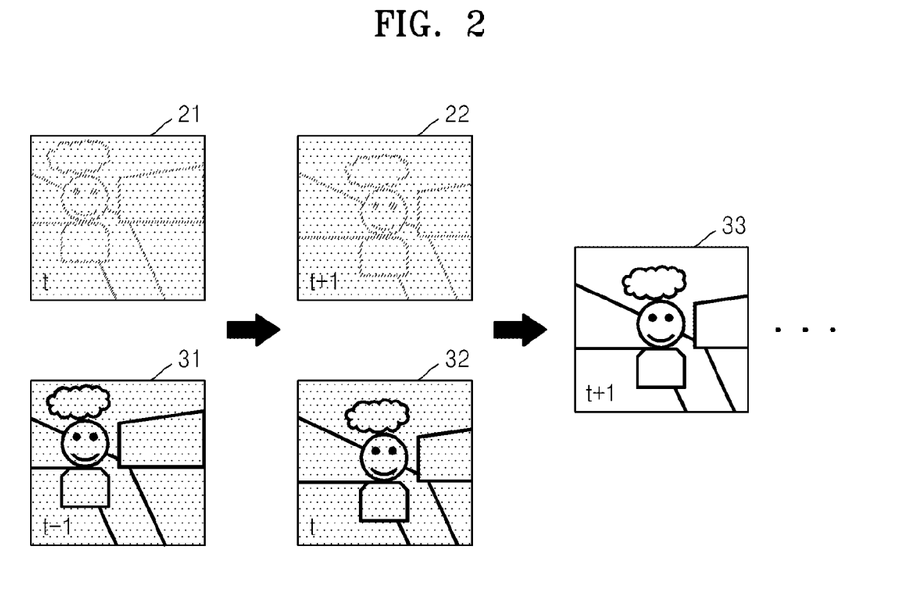
FIG. 2 is a diagram showing a dynamic super-resolution algorithm based on sequential data fusion, according to an exemplary embodiment.

Referring to FIG. 2, an estimated high-resolution image 32 of a current time t may be generated by aligning and/or fusing an estimated high-resolution image 31 of a previous time t−1 and a low-resolution input image 21 of the current time t. Furthermore, an estimated high-resolution image 33 of a next time t+1 may be generated by aligning and/or fusing the estimated high-resolution image 32 of the current time t and a low-resolution input image 22 of the next time t+1.

Figure 3:
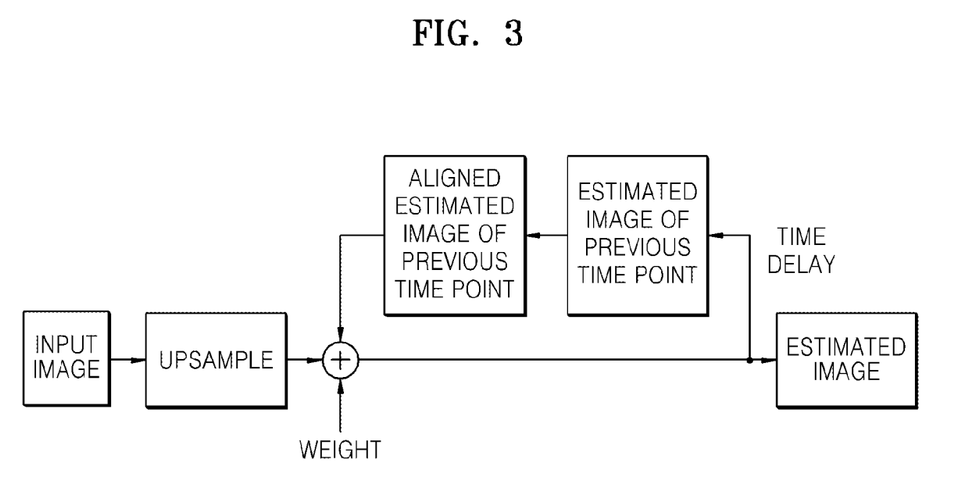
FIG. 3 is a diagram showing a super-resolution image reconstruction using a Kalman filter, according to an exemplary embodiment.

FIG. 3 shows a structure of a dynamic super-resolution algorithm for reconstructing a super-resolution image by using a Kalman filter. Here, image fusion during reconstruction of the super-resolution image may be performed for each pixel.

Referring to FIG. 3, the low-resolution input image 21 of the current time t may be upsampled to a high-resolution image by using the Kalman filter. Here, the estimated high-resolution image 32 of the current time t may be generated by upsampling the low-resolution input image 21 of the current time t to a high-resolution image and fusing the upsampled image and the estimated high-resolution image 31 of the previous time t−1, which is aligned with the umsampled input image.

The estimated high-resolution image 31, which is estimated at the previous time t−1, is time-delayed, aligned, fed back, and fused with the upsampled input image according to a weight of the Kalman filter based on a ratio between a prediction covariance and an innovation covariance, and thus, the estimated high-resolution image 32 of the current time t may be generated.

In addition, a process of acquiring a low-resolution input image may be modeled as shown in Equation 1 and 2 below. Equation 1 shows a process in which a high-resolution image x(t) is moved (M) and noise u is added thereto according to a motion of a camera or an object in the high-resolution image x(t) with respect to time. Equation 2 shows a process in which the high-resolution image x(t) of Equation 1 is blurred (B) by a camera lens and an image device sensor, the blurred image is downsampled at a constant ratio, and a weighted noise w is added thereto, and thus, the high-resolution image x(t) is deteriorated to a low-resolution image y(t).

$$x(t)=M(t)x(t-1)+u(t) \quad \text{[Equation 1]}$$

$$y(t)=DBx(t)+w(t) \quad \text{[Equation 2]}$$

After pixel values of a high-resolution image are estimated, if it is substituted with z(t)=Bx(t) to remove blurs, Equations 1 and 2 may be expressed as Equations 3 and 4, respectively.

$$z(t)=M(t)z(t-1)+v(t) \quad \text{[Equation 3]}$$

$$y(t)=Dz(t)+w(t) \quad \text{[Equation 4]}$$

Furthermore, in the dynamic model shown in Equations 3 and 4, the Kalman filter may be used to sequentially fuse low-resolution input images. Here, pixel estimation using the Kalman filter may be performed according to updating equations shown in Equations 5 and 6.

$$z'(t)=M(t)z'(t-1)+K(t)[y(t)-DM(t)z'(t-1)] \quad \text{[Equation 5]}$$

$$Cov(z'(t))=[I-K(t)D]P(t) \quad \text{[Equation 6]}$$

Here, z' indicates a high-resolution image in which blurs remain. P(t) indicates a prediction covariance, and K(t) indicates a Kalman gain defined as a ratio between the prediction covariance and an innovation covariance.

To reduce an amount of calculations, if it is assumed that a covariance matrix of a process noise v is a diagonal matrix, an estimating equation per pixel may be induced, and a high resolution image of a current time is sequentially corrected according to the induced updating equation. Here, in the case where a frame rate of an input image is sufficiently high, most inter-image motions may be approximated as planar motions. Furthermore, for estimation of the planar motions, a pixel displacement estimating method in a frequency domain may be used.

To process a color image, the suggested sequential image fusing method may be applied to each of color channels, including a red channel, a green channel, and a blue channel. When z(t) of Equation 3 is estimated, blur may be removed by post-processing, and thus, the high-resolution image x(t) may be acquired.

In the motion-based super-resolution algorithm, preciseness of estimating motions between images significantly affects an image reconstruction efficiency of the algorithm. Various techniques may be suggested for improving precision of image alignment. Here, considering an amount of calculations and a processing speed, it may be more effective to risk an alignment error up to a certain degree and perform forced image data fusion.

In an estimating method using the Kalman filter, an image registration error due to misalignment of images may be compensated for via measurement validation of newly detected values.

Thus, referring back to FIG. 1, operation S130 may include an operation of calculating an image registration error (S131), an operation of comparing the image registration errors with the threshold value (S132), and operations of updating the estimated high-resolution image of the current time (S133 and S134. The operation S130 may be performed to generate the high-resolution image of the current time in operation S120.

In operation S131, an image registration error between the upsampled input image of the current time and the estimated high-resolution image of the previous time is calculated. In operation S132, the calculated image registration error is compared to the threshold value. In operations S133 and S134, the estimated high-resolution image of the current time is generated (or updated) by reflecting or not reflecting input image, more specifically, the upsampled input image based on a result of operation S132.

In operations S133 and S134, the estimated high-resolution image of the current time is generated by reflecting the estimated high-resolution image of the previous time and the upsampled input image if the image registration error is less than the threshold value (S133), whereas the estimated high-resolution image of the current time is generated by reflecting the estimated high-resolution image of the previous time without the upsampled input image if the image registration error is not less than the threshold value (S134).

Here, the image registration error may be calculated for each pixel based on the upsampled input image the estimated high-resolution image of the previous time. Here, the estimated high-resolution image of the current time may be generated for each pixel according to the image registration error.

Therefore, errors due to image alignment may be considered for each pixel, and thus, the efficiency of super-resolution image reconstruction may be improved by not reflecting pixels with image alignment errors. The image registration error may be calculated using a Mahalanobis distance d as shown in Equation 7.

$$d=[y(t)-Dz'_M(t)]^T S^{-1}(t)[y(t)-Dz'_M(t)]$$ [Equation 7]

Here, $z'_M$ indicates a prediction covariance, whereas S indicates an innovation covariance.

In the case of a misalignment between the upsampled input image of the current time and the estimated high-resolution image of the previous time, a pixel difference between the two images increases. Therefore, pixels of the upsampled input image, of which the image registration error exceeds the threshold value, will not be used for estimating pixel values of the high-resolution image of the current time, and thus, deterioration of the efficiency of reconstructing a super-resolution image due to misalignment of images may be prevented.

Here, a reconstruction distance d, which is calculated according to Equation 7 under the assumption of Gaussian noise, follows a chi-square distribution. Therefore, the threshold value may be selected from a chi-square table.

The reconstruction error (deterioration of the efficiency of reconstructing a super-resolution image) due to misalignment of the upsampled input image of the current time and the estimated high-resolution image of the previous time is compensated for based on the image registration error calculated between the upsampled input image and the estimated high-resolution image of the previous time. In other words, in operation S130, if the image registration error is not less than the threshold value, it is determined that misalignment of between the two images occurs, and the image registration error will not be used for estimating the pixel values of the high-resolution image of the current time. Therefore, deterioration of the efficiency of reconstructing a super-resolution image due to misalignment of images may be prevented.

Figure 4A:
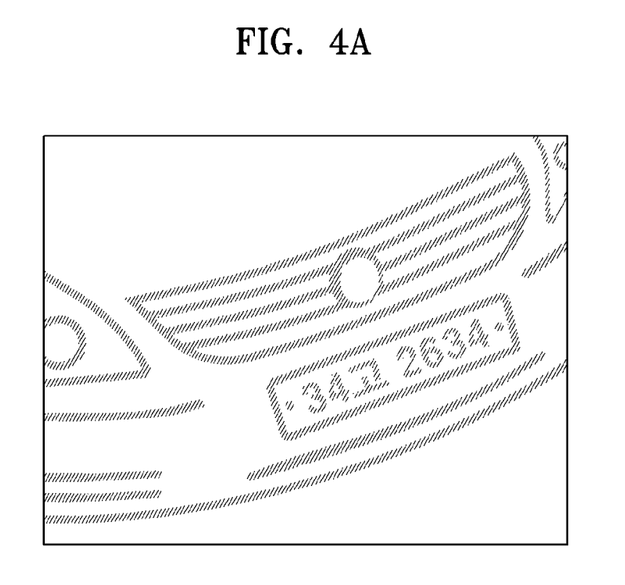
FIG. 4A is a diagram showing an image to which a measurement validation is not applied, according to an exemplary embodiment.
Figure 4B:
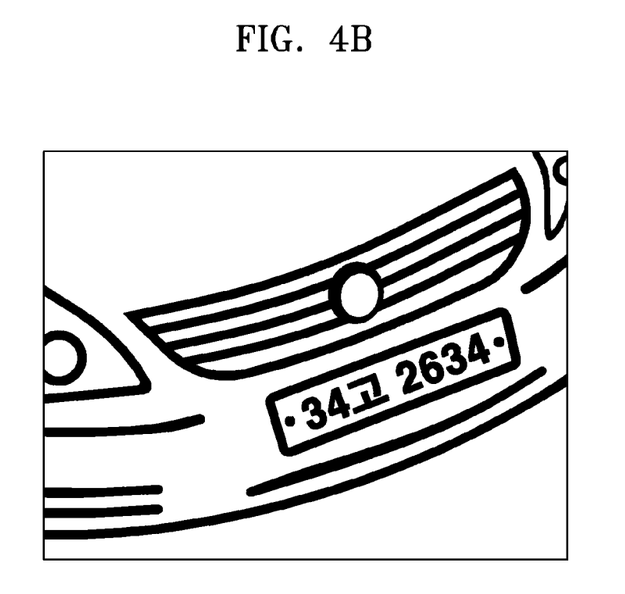
FIG. 4B is a diagram showing an image to which a measurement validation is applied, according to an exemplary embodiment.

FIGS. 4A and 4B show an image, to which the measurement validation in operation S130 is not applied, and an image, to which the measurement validation in operation S130 is applied, respectively, according to an exemplary embodiment.

Considering outlines of a reconstructed object (i.e., a front part of a vehicle) in the image or reconstructed contents of the object (numbers of a license plate of the vehicle), a quality of the reconstructed image, to which the measurement validation is applied, is better than a quality of the reconstructed image to which the measurement validation is not applied.

Also, in reconstructing a high-resolution image via sequential data fusion in the dynamic super-resolution algorithm, an estimated value of a current time is affected by an estimated high-resolution value of a previous time.

Therefore, in a case of an unexpected scene change in an input image, images of two different scenes may overlap in a reconstructed image. To avoid such an image fusion error, a high-resolution value estimated at a previous time may be initialized in the case of an unexpected scene change. Therefore, an image fusion error due to an unexpected scene change during reconstruction of a super-resolution image may be prevented.

Here, operation S140 may include an operation of calculating a number of invalid pixels (S141), an operation of comparing the number of the invalid pixels (S142), and operations of reflecting scene changes (S143 and S144).

In operation S141, a number of the invalid pixels each of which has an image registration error not less than the threshold value is calculated. In operation S142, the number of the invalid pixels is compared to a limit pixel number.

Through operations S143 and S144, a target image having high-resolution of a current time to be displayed is determined according to a result of the comparison between the number of the invalid pixels and the limit pixel number at operation 142. If the number of the invalid pixels is less than the limit pixel number, the estimated high-resolution image of the current time is taken as the target image of the current time (S143). Otherwise, if the number of the invalid pixels is not less than the limit pixel number, the estimated high-resolution image of the previous time is initialized and the estimated high-resolution image of the current time is generated using the upsampled input image without considering the estimated high-resolution image of the previous time before the initialization and the upsampled input image is taken as the target image of the current time (S144).

In other words, if the number of invalid pixels is not less than the limit pixel number, it is determined that a scene change has occurred. Therefore, an image fusion error due to an unexpected scene change may be avoided by initializing a value (e.g., pixel values) of the estimated high-resolution image of the previous time.

It may be determined whether a scene change has occurred in the input image based on a ratio of the limit pixel number, where the ratio of the limit pixel number is a ratio of a number of pixels each of which has an image registration error, corresponding to a pixel value difference calculated according to Equation 7, not less than the threshold value, and a number of entire pixels of an image, or a ratio of a number of pixels not affecting estimation of the high-resolution image and the number of the entire pixels of the image.

Here, if the ratio of the limit pixel number is set to 0.3, a low-resolution input image, of which more than 30% of pixels are pixels invalid for image fusion, that is, pixels with image registration errors exceeding the threshold value, may be determined as an image corresponding to a scene different from a scene to which previously input images correspond, in the scene change detection in operation S140

Figure 5:
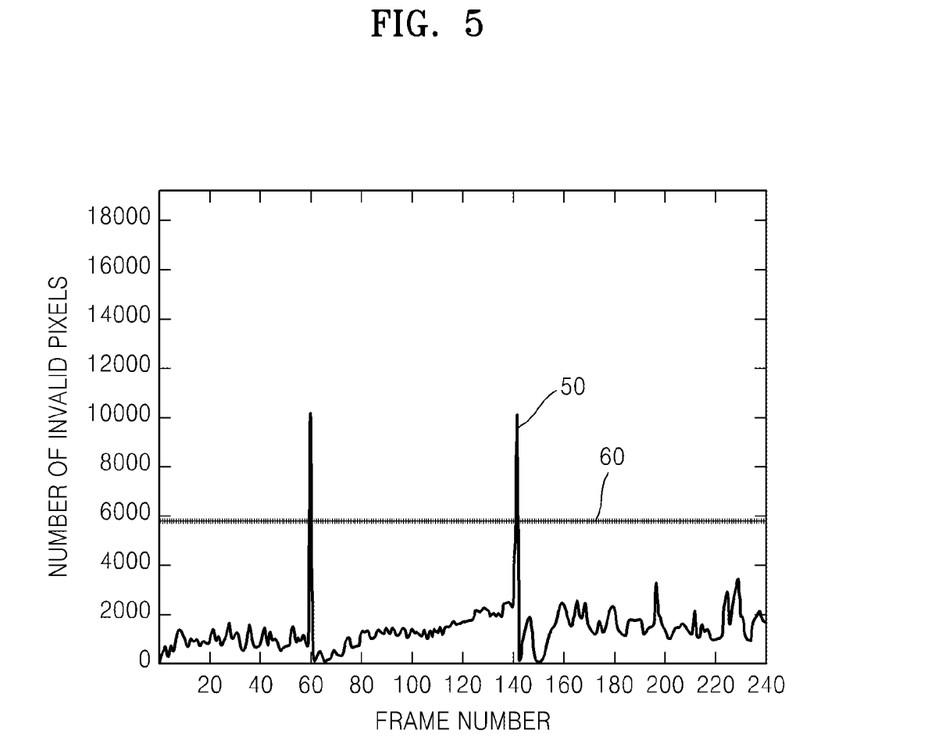
FIG. 5 is a graph showing a number of invalid pixels with respect to a number of frames input at a constant interval in an input image used for the scene change detection, according to an exemplary embodiment.

FIG. 5 is a graph showing a number of invalid pixels with respect to a number of frames input at a constant interval in an input image used for the scene change detection. In FIG. 5, it is considered that a scene change is detected in a case where a ratio of a number of invalid pixels and a number of entire pixels of the input image exceeds a ratio of a limit pixel number (0.6).

In FIG. 5, since scene changes have occurred twice (at the frame number 141 and 61), an image including three different scenes is processed. An input image including a plurality of scenes may be reconstructed without an error by initializing an image fusion process every time a different scene is detected in the low-resolution input image according to the scene change detection method according to the present exemplary embodiment.

Figure 7:
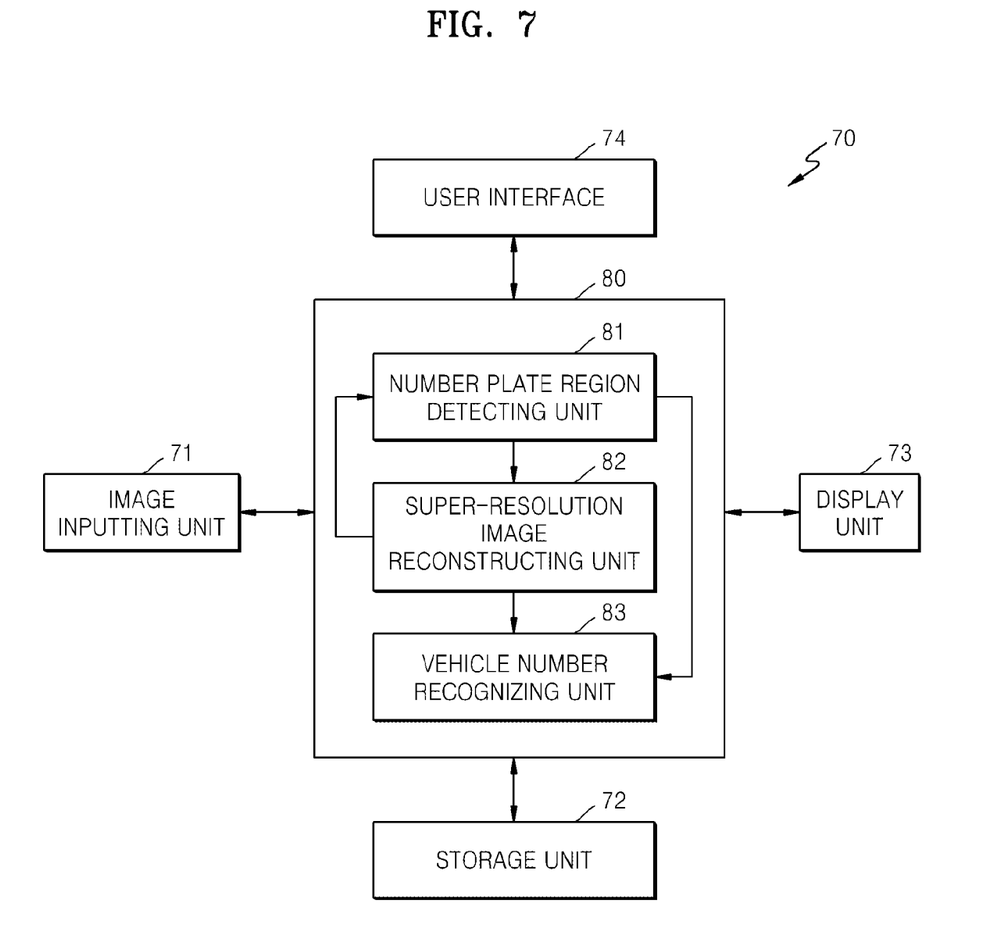
FIG. 7 is a block diagram of the illegally parked vehicle detecting system according to an exemplary embodiment.

The method described above in reference to FIG. 1 according to the present exemplary embodiment may be applied to a super-resolution image reconstruction with respect to a particularly interest object in motion in various surveillance systems including an illegally parked vehicle detecting system (70 in FIG. 7). The method may be applied to reconstruction of images of a vehicle in motion or a face of a person, detection of illegally parked vehicles, real-time recognition of a license plate number, or the like.

Figure 6:
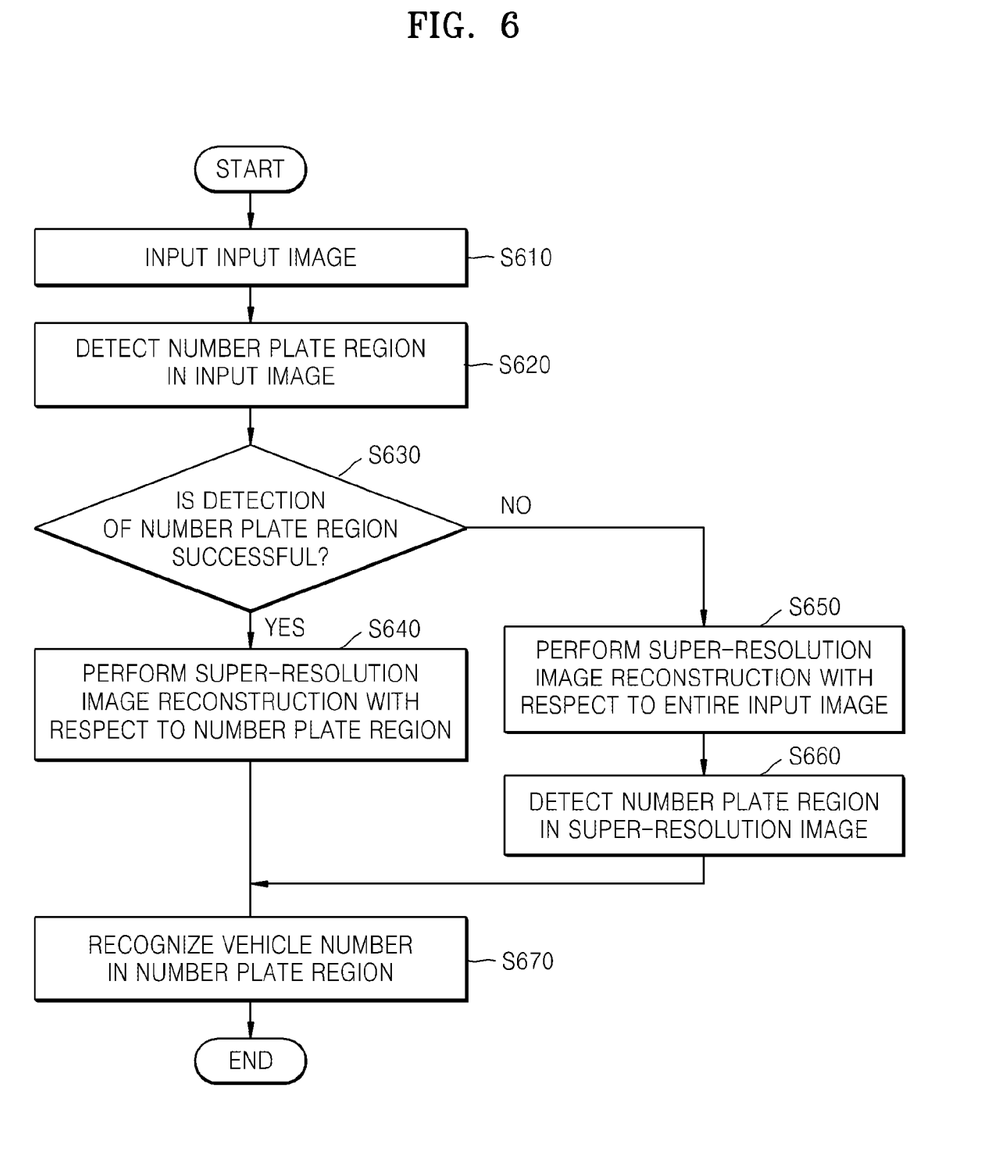
FIG. 6 is a flowchart of a method of detecting a license plate number of a vehicle, according to an exemplary embodiment.

FIG. 6 is a flowchart of a method of detecting a license plate number of a vehicle, according to another exemplary embodiment. Since the method of FIG. 6 is an application of the method shown in FIG. 1, detailed descriptions on the same features will be omitted.

Referring to FIG. 6, the method includes an operation of inputting an image (S610), an operation of detecting a number plate region (S620), an operation of determining if detection is successful (S630), an operation of super-resolution image reconstruction (S640) and an operation of recognizing a vehicle number (S670). The number plate region may be a license plate number region of a vehicle. Furthermore, a vehicle number may be a license plate number of a vehicle.

In operation S610, an image is input. In operation S620, a number plate region is detected in the input image. In operation S630, it is determined whether a number plate region is detected in the input image.

In operation S640, if the number plate region is detected in the input image, super-resolution image reconstruction of the image with higher resolution than the input image is performed with respect to the number plate region. In operation S670, a vehicle number is recognized from a super-resolution image with respect to the number plate region.

In operation S640, the super-resolution image is reconstructed by generating an estimated high-resolution image of a current time by fusing corresponding pixel information of each of a high-resolution image estimated at a previous time and the input image. Here, operation S640 may be embodied with respect to the detected number plate region by using the method shown in FIG. 1.

Since the super-resolution image reconstruction is only performed with respect to the number plate region rather than the entire input image in operation S640, the super-resolution image reconstruction may be performed with relatively small memory consumption. Furthermore, operation S640 may be performed relatively quick.

Furthermore, since recognition of the vehicle number is performed with respect to the super-resolution reconstructed region in the operation S670, an efficiency of recognizing the vehicle number may be improved.

The method may further include an operation of super-resolution image reconstruction with respect to an entire input image (S650) and an operation of detecting the number plate region (S660).

In operation S650, in the case where the number plate region is not detected in the input image, super-resolution image reconstruction may be performed with respect to the entire input image. In operation S660, the number plate region may be detected in the super-resolution image with respect to the entire input image.

Here, even if detection of the number plate region in a low-resolution image has failed, a high-resolution image may be generated by using the method 100 of reconstructing a super-resolution image and the number plate region may be easily detected in the super-resolution image. Therefore, the number plate region may be detected in the low-resolution image having insufficient information for detection of the number plate region.

The number plate region detected in operation S620 or S650 may be a region, which includes the number plate and is larger than the number plate. For example, a size of the number plate region may be twice as a region actually occupied by the number plate.

Therefore, the efficiency of recognizing the vehicle number may be improved by preventing information required for recognition of the vehicle number from being omitted in a number plate region.

In operations S620 and S650, the number plate region may be detected by using a modified census transformation (MCT), suggested by Froba and Ernst. In using the MCT, a structural pattern of a pixel at a particular location may be expressed by comparing intensities and an average intensity of the pixel at the particular location and the surrounding pixels of the pixel at the particular location.

Here, the structural pattern with respect to a particular pixel and eight pixels surrounding the particular pixels may be expressed by using a 3×3 kernel. Intensities and an average intensity of all pixels included in each of kernels may be compared, each pixel may be arranged as a matrix of binary numbers according to a result of the comparison, and the binary numbers may be converted to a decimal numbers.

Furthermore, a cascaded Adaboost algorithm may be used for training a classifier for distinguishing a number plate image and a background image. First, binary weak classifiers appropriate for the structural pattern feature of a pixel are designed, and a strong classifier may be generated by combining the weak classifiers through Adaboost training Finally, a detector may be formed by arranging a strong classifier cascaded in four stages.

Super-resolution image reconstruction may be performed with respect to the number plate region only if the number plate region is located within a predetermined distance from a number plate region detected at a previous time. Therefore, erroneous detection may be prevented even if an input image includes two or more number plates, and thus stability of detecting the number plate region may be improved.

If the number plate region is detected in an initially input image, initial results of detecting the number plate in sequential images are sequentially applied to the super-resolution image reconstruction algorithm, and thus, a high-resolution image of the number plate may be acquired. Here, if there is an error in the initial results of detecting the number plate, an image including information different from the image of the number plate is used for super-resolution image reconstruction, and thus, a result of the super-resolution image reconstruction may be deteriorated.

Therefore, according to an exemplary embodiment, it may prevent a result of erroneous detection from being used by the super-resolution image reconstruction algorithm by applying a result of detection performed only with respect to images of previous time of sequentially input images and a result of detection performed only with respect to adjacent locations through detecting a region at which a selected number plate region and a number plate region to be updated overlap each other and post-processing of the sequential images.

If a size of a number plate in an input image is less than a minimum detection size or a quality of the input image is poor due to low-illuminant environment, initial detection of the number plate may fail. Therefore, in a related art method of detecting the number plate, the odds of successfully recognizing the number plate is limited with a single fixed background camera. Therefore, the related art method of detecting the number plate requires a plurality of cameras for recognizing a vehicle number for detecting the number plate region and recognizing the vehicle number.

However, according to the method according to the present exemplary embodiment, a super-resolution region may be reconstructed with respect to the number plate region, and thus, a surveillance camera system for detecting illegally parked vehicles or the like may be embodied by using a single fixed or mobile camera, including a related art traffic surveillance camera.

The method of FIG. 1 and the method of FIG. 6 may be applied to an illegally parked vehicle detecting system 70 as shown in FIG. 7. However, the inventive concept is not limited thereto, and may be applied to various surveillance systems detecting various objects such as a face of a person.

FIG. 7 is a block diagram of the illegally parked vehicle detecting system 70 according to another exemplary embodiment. The illegally parked vehicle detecting system 70 shown in FIG. 7 is an application of the method 100 and the method shown in FIGS. 1 and 6, respectively. Detailed descriptions on the same features will be omitted.

However, the inventive concept is not limited thereto, and methods of super-resolution image reconstruction and number plate detection consistent with the inventive concept other than the method of FIG. 1 and/or the method of FIG. 6 may be applied to the illegally parked vehicle detecting system 70.

Referring to FIG. 7, the illegally parked vehicle detecting system 70 may include an image inputting unit 71, a number plate region detecting unit 81, a super-resolution image reconstructing unit 82, and a vehicle number recognizing unit 83. Here, the number plate region detecting unit 81, the super-resolution image reconstructing unit 82, and the vehicle number recognizing unit 83 may be embodied within a single control unit, which includes a microcomputer and/or a digital signal processor.

An image is input to the image inputting unit 71. The number plate region detecting unit 81 detects a number plate region in the input image. The super-resolution image reconstructing unit 82 reconstructs an image with higher resolution than the input image with respect to the number plate region. The vehicle number recognizing unit 83 recognizes a vehicle number from a super-resolution image with respect to the number plate region.

Here, the super-resolution image is reconstructed by generating an estimated high-resolution image of a current time by fusing corresponding pixel information of each of a high-resolution image estimated at a previous time and the upsampled input image of the current time.

According to an exemplary embodiment, since super-resolution image reconstruction is only performed with respect to the number plate region rather than the entire input image, the super-resolution image reconstruction may be performed with relatively small memory. Furthermore, super-resolution image reconstruction may be performed relatively in a short period of time.

Furthermore, since recognition of a vehicle number is performed with respect to the super-resolution reconstructed region, the efficiency of recognizing the vehicle number may be improved, and thus, the efficiency of detecting illegally parked vehicles may be improved.

In the case where the number plate region is not detected in the input image, the super-resolution image reconstructing unit 82 may reconstruct a super-resolution image with respect to the entire input image. Here, the number plate region detecting unit 81 may detect the number plate region in a super-resolution image with respect to the entire input image.

In other words, even if detection of the number plate region in a low-resolution image has failed, a high-resolution image may be generated by using a method of reconstructing a super-resolution image and the number plate region may be easily detected in the super-resolution image. Therefore, the number plate region may be detected in a low-resolution image having insufficient information for detection of the number plate region.

In an estimating method using the Kalman filter, the super-resolution image reconstructing unit 82 may compensate an image registration error due to misalignment of images may be compensated for via measurement validation of newly detected values.

Here, the super-resolution image reconstructing unit 82 may calculate an image registration error between an upsampled input image of the current time and an estimated high-resolution image of the previous time, and may determine whether the input image, more specifically, the upsampled input image shall affect estimation of pixel values of a high-resolution image of the current time.

Here, the estimated high-resolution image of the current time t may be generated by reflecting the estimated high-resolution image of the previous time and the upsampled input image if the image registration error is less than the threshold value. Furthermore, the estimated high-resolution image may be generated without reflecting the upsampled input image if the image registration error is not less than the threshold value.

Here, the image registration error may be calculated for each pixel based on the upsampled input image and the estimated high-resolution image of the previous time. Here, the estimated high-resolution image of the current time may be updated for each pixel according to the image registration error.

Therefore, errors due to image alignment may be considered for each pixel, and thus, the efficiency of super-resolution image reconstruction may be improved by not reflecting pixels with image alignment errors.

The super-resolution image reconstructing unit 82 may detect an unexpected scene change in an input image by using a technique for scene change detection and prevent images of two difference scenes from being overlapped in a reconstructed image.

Here, the super-resolution image reconstructing unit 82 may calculate a number of invalid pixels each of which has an image registration error not less than the threshold value, and if the number of invalid pixels is less than a limit pixel number, an estimated high-resolution image of the current time may become an image of the current time. If the number of invalid pixels is greater than the limit pixel number, it is determined that a scene change has occurred, and thus, an image of the previous time may be initialized, and an estimated high-resolution image of the current time may be generated without considering the estimated high-resolution image of the previous time before the initialization.

Therefore, if it is determined that the scene change has occurred, generation of the estimated high-resolution image of the current time t may be prevented from being affected by an image of the previous time. Therefore, an image fusion error due to an unexpected scene change may be avoided.

A system for detecting illegally parked vehicle may include one fixed background camera and a plurality of cameras for vehicle number recognition. Here, the fixed camera performs detection of vehicles in wide range. The cameras for vehicle number recognition acquire input images via panning, tilting, and zooming.

In this case, a relatively expensive pen-tilt zoom (PTZ) camera is necessary. Furthermore, existing related-art traffic surveillance cameras may not be used for detection of illegally parked vehicles and a separate system may have to be established. Furthermore, high resolution images captured by a PTZ camera shall be stored separately, and thus, an additional storage capacity may be required.

However, the illegally parked vehicle detecting system 70 according to the present exemplary embodiment may reconstruct a super-resolution image with respect to a number plate region. Therefore, a surveillance camera system for detection of illegally parked vehicles or the like may be embodied with a single fixed or mobile camera, which includes an existing conventional traffic surveillance camera, without installing an expensive PTZ camera.

The illegally parked vehicle detecting system may include a storage unit 72, a display unit 73, and a user interface 74.

Low-resolution input images and super-resolution images with high resolutions may be stored in the storage unit 72. The display unit 73 may display information including an input image, a number plate region, and/or a vehicle number. The user interface 74 may be any of various types of consoles via which a user inputs instructions.

Since the image inputting unit 71 of the illegally parked vehicle detecting system 70 may be embodied with a signal camera, including a related-art traffic surveillance camera, the storage unit 72 may have relatively small memory capacity as compared to the case of using an expensive PTZ camera, the case where high resolution frame images successively input shall be stored.

According to the exemplary embodiments, the efficiency of super-resolution image reconstruction may be improved by reconstructing a high-resolution image of a current time by fusing pixel information of a high-resolution image estimated at a previous time and a low-resolution input image input at the current time.

While the exemplary embodiments have been particularly shown and described, it will be understood by those of ordinary skill in the art that various changes in form and details may be made therein without departing from the spirit and scope of the inventive concept as defined by the following claims.

What is claimed is:

1. A method of generating a super-resolution image, the method comprising:
   inputting an image;
   generating an estimated high-resolution image of a current time by fusing an input image and an estimated high-resolution image of a previous time corresponding to the input image;
   calculating a number of invalid pixels each of which has an image registration error not less than a threshold value;
   comparing the number of the invalid pixels to a limit pixel number; and
   determining the estimated high-resolution image of the current image as an image of the current time if the number of the invalid pixels is less than the limit pixel number, and generating a high-resolution image of the current image without considering the estimated high-resolution image of the previous time before the initialization if the number of the invalid pixels is not less than the limit pixel number,
   wherein the image registration error corresponds to a degree of misalignment between the input image and the estimated high-resolution image of the previous time.

2. The method of claim 1, wherein the estimated high-resolution image of the current time is generated by upsampling the input image to high resolution and adding the upsampled input image to the high-resolution image of the previous time which is aligned with the upsampled input image.

3. The method of claim 1, further comprising:
   calculating the image registration error between the input image and the estimated high-resolution image of the previous time;
   comparing the image registration error to the threshold value; and
   updating the estimated high-resolution image of the current time by reflecting the estimated high-resolution image of the previous time if the image registration error is less than the threshold value.

4. The method of claim 3, wherein the estimated high-resolution image of the current time is generated by reflecting the estimated high-resolution image of the previous time without the upsampled input image if the image registration error is not less than the threshold value.

5. The method of claim 3,
   wherein the image registration error is calculated for each pixel between the upsampled input image and the estimated high-resolution image of the previous time, and
   the estimated hige-resolution image of the current time is generated for each pixel according to the image registration error.

6. The method of claim 1, wherein the estimated high-resolution image of the previous time is initialized.

7. A surveillance system comprising:
   an image inputting unit through which an image is input; and
   an image generation unit which generates a super-resolution image having a higher resolution than a resolution of the input image,
   wherein the image generation unit calculates an image registration error between the input image and the estimated high-resolution image of the previous time, and generates the estimated high-resolution image of the current time by reflecting the estimated high-resolution image of the previous time and the upsampled input image if the image registration error is less than a threshold value,
   wherein the image registration error corresponds to a degree of misalignment between the input image and the estimated high-resolution image of the previous time, and
   wherein the image generation unit calculates a number of invalid pixels each of which has the image registration error not less than the threshold value and determines the estimated high-resolution image of the current time as an image of the current time if the number of the invalid pixels is less than a limit pixel number.

8. The system of claim 7, further comprising:
   a detecting unit which detects a selected region from the input image; and
   a recognizing unit which recognizes content included in the super-resolution image,
   wherein the image generation unit generates the super-resolution image with respect to the selected region among an entire region of the input image.

9. The system of claim 8, wherein, if the selected region is not detected from the input image, the image generation unit generates the super-resolution image with respect to the entire region of the input image, and
   wherein the detecting unit detects the selected region from the super-resolution image generated with respect to the entire region of the input image.

10. The system of claim 9, wherein the selected region comprises a sub-region comprising the content.

11. The system of claim 10, wherein the selected region comprises a sub-region comprising the content.

12. The system of claim 7, wherein the image generation unit generates the estimated high-resolution image of the current time by reflecting the estimated high-resolution image of the previous time without the upsampled input image if the image registration error is not less than the threshold value.

13. The system of claim 7, wherein the estimated high-resolution image of the previous time is initialized and a high-resolution image of the current time is generated without considering the estimated high-resolution image of the previous time before the initialization if the number of the invalid pixels is not less than the limit pixel number.

14. The system of claim 8, wherein the super-resolution image is generated with respect to the selected region only if the selected region is located within a predetermined distance from a corresponding selected region detected at a previous time.

15. The system of claim 8, wherein the image inputting unit comprises a single camera installed at a given location.

\* \* \* \* \*